United States Patent
Wang et al.

(10) Patent No.: US 11,617,136 B2
(45) Date of Patent: Mar. 28, 2023

(54) NON-TERRESTRIAL NETWORK POWER CONTROL BASED ON HARQ RETRANSMISSION ON OR OFF

(71) Applicant: QUALCOMM Incorporated, San Diego, CA (US)

(72) Inventors: Xiao Feng Wang, San Diego, CA (US); Liangping Ma, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 63 days.

(21) Appl. No.: 17/143,864

(22) Filed: Jan. 7, 2021

(65) Prior Publication Data

US 2021/0219241 A1   Jul. 15, 2021

Related U.S. Application Data

(60) Provisional application No. 62/959,867, filed on Jan. 10, 2020.

(51) Int. Cl.

| | |
|---|---|
| *H04W 52/32* | (2009.01) |
| *H04W 52/14* | (2009.01) |
| *H04L 25/02* | (2006.01) |
| *H04W 72/04* | (2023.01) |
| *H04L 1/1812* | (2023.01) |

(52) U.S. Cl.
CPC ......... *H04W 52/146* (2013.01); *H04L 1/1819* (2013.01); *H04L 25/0226* (2013.01); *H04W 72/042* (2013.01)

(58) Field of Classification Search
CPC ..... H04W 52/32; H04W 16/28; H04W 72/14; H04W 52/34; H04W 52/38; H04W 52/06; H04W 52/10; H04W 52/18
See application file for complete search history.

(56) References Cited

U.S. PATENT DOCUMENTS

| | | | |
|---|---|---|---|
| 2018/0310257 A1 | 10/2018 | Papasakellariou | |
| 2019/0253988 A1 | 8/2019 | Khoshnevisan et al. | |
| 2020/0314812 A1* | 10/2020 | Xu | H04W 52/146 |
| 2020/0351931 A1* | 11/2020 | Babaei | H04W 76/27 |

FOREIGN PATENT DOCUMENTS

| | | |
|---|---|---|
| EP | 2360864 A1 | 8/2011 |
| EP | 2763470 A1 | 8/2014 |

OTHER PUBLICATIONS

International Search Report and Written Opinion—PCT/US2021/012707—ISA/EPO—dated May 4, 2021.

* cited by examiner

*Primary Examiner* — Tu X Nguyen

(74) *Attorney, Agent, or Firm* — Arent Fox, LLP

(57) ABSTRACT

A configuration to enable a UE to utilize uplink power control parameters for when HARQ retransmission or HARQ feedback is enabled or disabled. The apparatus may receive DCI from a base station. The DCI may indicate a HARQ process number and at least one of a first set of power control parameters for a first power control mode or a second set of power control parameters for a second power control mode. The apparatus may determine whether the first or the second power control mode is to be used. The apparatus may transmit information on a PUSCH based on the first set of power control parameters or the second set of power control parameters based on the determination whether the first or second power control mode is to be used.

26 Claims, 11 Drawing Sheets

NON-TERRESTRIAL NETWORK POWER CONTROL BASED ON HARQ RETRANSMISSION ON OR OFF

CROSS-REFERENCE TO RELATED APPLICATION

This application claims the benefit of U.S. Provisional Application Ser. No. 62/959,867, entitled "NON-TERRESTRIAL NETWORK POWER CONTROL BASED ON HARQ RETRANSMISSION ON OR OFF" and filed on Jan. 10, 2020, the contents of which are expressly incorporated by reference herein in their entirety.

BACKGROUND

Technical Field

The present disclosure relates generally to communication systems, and more particularly, to non-terrestrial network (NTN) power control in wireless communication systems.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some wireless communication systems, an access network may provide a user equipment (UE) with an indication of at least one uplink power control parameter via at least one sounding reference signal (SRS) resource indicator (SRI). According to some aspects, each of a set of power control parameters may correspond to a respective type of SRI. For example, a set of power control parameters may include a power control parameter that corresponds to an identifier (ID) and associated downlink reference signal, e.g., for path loss configured in the primary cell for a secondary cell indicated by an SRS resource configuration, such as SRI-PUSCH-PathlossReferenceRS-Id. Further, the set of power control parameters may include various power control parameters configured in a serving cell, such as at least one open-loop power control parameter (e.g., SRI-P0-PUSCH-AlphaSetId), and/or closed-loop power control parameter (e.g., SRI-PUSCH-ClosedLoopIndex).

A UE may receive some or all of the foregoing power control parameters via radio resource control (RRC) signaling or another type of signaling. Potentially, an SRI may include a set of uplink power control parameters, and the UE may be configured with multiple different SRIs. Each of the multiple SRIs may be associated with a respective beam of a set of multiple different beams. Therefore, a set of uplink power control parameters configured through an SRI may be beam-specific, e.g., so that the UE may apply an appropriate set of uplink power control parameters when transmitting via an associated beam.

In some networks, such as non-terrestrial networks (NTN), a UE may be configured to provide some acknowledgement (ACK) and/or negative ACK (NACK) feedback on one or more hybrid automatic repeat request (HARQ) processes. As such feedback has the potential to become lost or corrupted, e.g., during over-the-air transmission, the UE may be further configured for HARQ retransmission. In particular, HARQ retransmission may be semi-statically configured as enabled or disabled for each HARQ process.

For uplink communications, information (e.g., data and/or control information) to be transmitted may not be buffered when HARQ retransmission is disabled for the corresponding HARQ process, e.g., due to the relatively long duration of delays associated with geostationary satellites, which may include delays of approximately 500 milliseconds (ms). Enabling HARQ retransmissions with relatively long delays may impact retransmission, such that the reliability of the transmission is reduced. As such, HARQ retransmissions may be disabled in some instances (e.g., with relatively long delays), and instead, modulation and coding schemes and/or related optimizations may be relied upon to provide reliable delivery of information (e.g., data and/or control information), e.g., within some latency constraints.

Specifically, different block error rates (BLER) may be targeted for different transmissions based on whether HARQ retransmission is enabled or disabled. In some instances, a BLER of $10^{-5}$ may be configured for a HARQ process having HARQ retransmission disabled, whereas a BLER of $10^{-1}$ may be configured for a HARQ process having HARQ retransmission enabled.

The reliability of a transmission, e.g., as represented by BLER, may be affected by the transmission power used for the transmission. Therefore, different sets of uplink power control parameters may impact the reliability of different transmissions. Therefore, a need exists for configuring different sets of uplink power control parameters according to different reliability objectives and/or constraints (e.g., as represented by BLER).

The present disclosure describes various techniques and approaches to configuring different sets of uplink power control parameters to be applied in different instances. Specifically, sets of uplink power control parameters may be configured for use when HARQ retransmission is enabled or disabled. Accordingly, a UE may apply a set of uplink power control parameters based on whether HARQ retransmission is enabled or disabled, e.g., for a HARQ process associated with the transmission by the UE. Such applications of sets of uplink power control parameters based on whether HARQ retransmission is enabled or disabled may improve the reliability of uplink transmissions, e.g., so that BLER targets for transmissions can be met by a UE.

In an aspect of the disclosure, a method, a computer-readable medium, and an apparatus are provided. The apparatus may receive downlink control information (DCI) from a base station. The DCI may indicate a HARQ process number and at least one of a first set of power control parameters for a first power control mode or a second set of power control parameters for a second power control mode. The apparatus may determine whether the first or the second power control mode is to be used. The apparatus may transmit information on a physical uplink shared channel (PUSCH) based on the first set of power control parameters or the second set of power control parameters based on the determination of whether the first or second power control mode is to be used.

In another aspect of the disclosure, a method, a computer-readable medium, and an apparatus are provided. The apparatus may transmit DCI to a UE, the DCI indicating a HARQ process number and at least one of a first set of power control parameters for a first power control mode or a second set of power control parameters for a second power control mode. The apparatus may receive information transmitted on a PUSCH from the UE, the transmission of the information on the PUSCH being associated with the first set of power control parameters or the second set of power control parameters.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
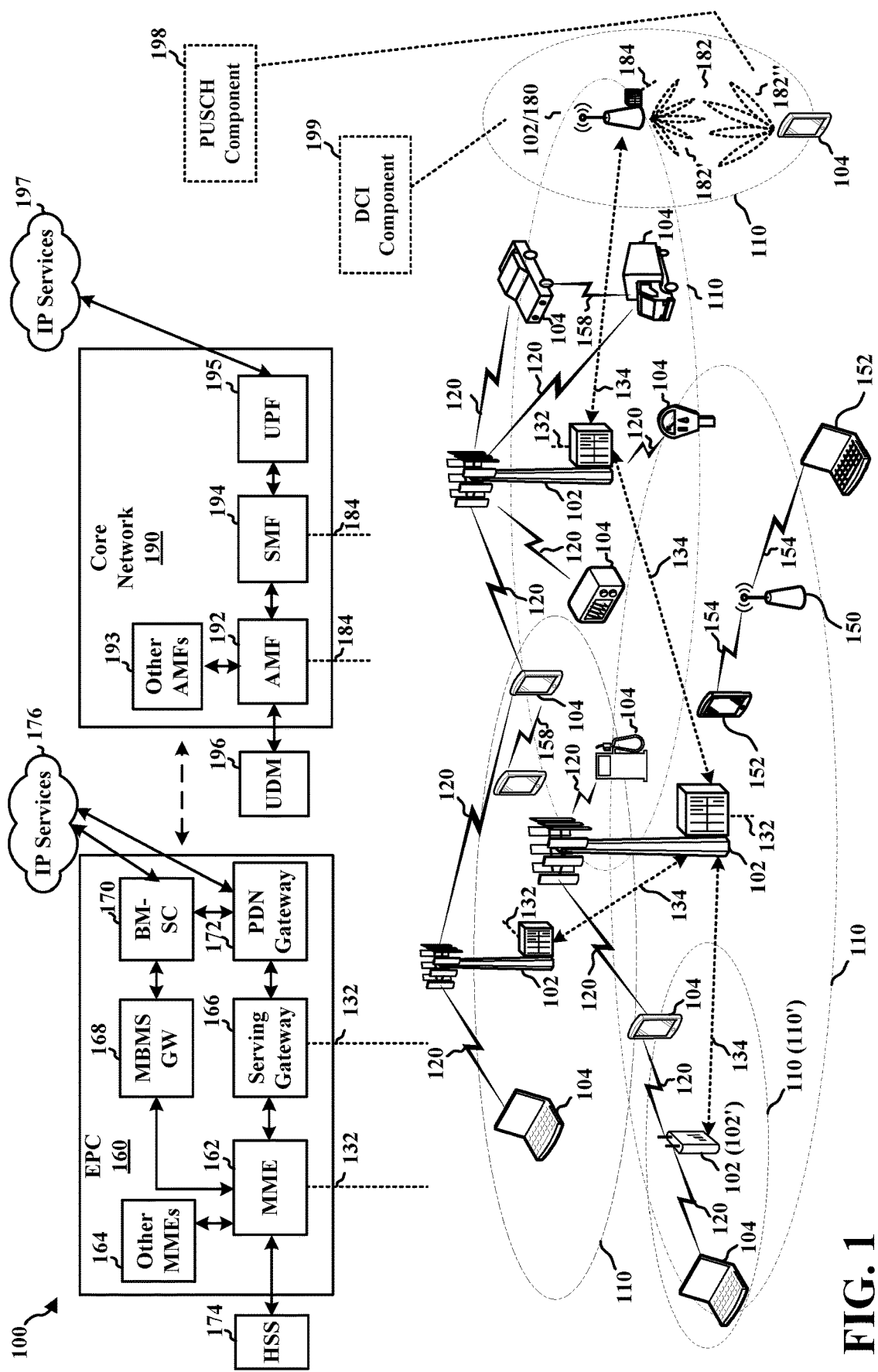
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to utilize uplink power control parameters indicating a first power control mode or a second power control mode for when hybrid automatic repeat request (HARQ) retransmission or HARQ feedback is enabled or disabled. For example, the UE 104 of FIG. 1 may include a PUSCH component 198 configured to transmit information on a PUSCH based on first or second set of power control parameters, with the UE 104 being configured to select between the first and second sets of power control parameters based on whether the first or second power control mode is to be used. The information transmitted on the PUSCH by the UE 104 may include data and/or control information. For example, the information may include some HARQ information, such as HARQ feedback indicating acknowledgement (ACK) or negative ACK (NACK).

The UE 104 may receive DCI from a base station (e.g., the base station 102/180). The DCI may indicate a HARQ process number and at least one of a first set of power control parameters for a first power control mode or a second set of power control parameters for a second power control mode. The UE 104 may determine whether the first or second power control mode is to be used. The UE 104 may transmit information on the PUSCH based on the first set of power control parameters or the second set of power control parameters based on the determination whether the first or second power control mode is to be used.

Referring again to FIG. 1, in certain aspects, the base station 102/180 may be configured to configure a UE (e.g., the UE 104) with uplink power control parameters indicating a first power control mode or a second power control mode for when HARQ retransmission or HARQ feedback is enabled or disabled. For example, the base station 102/180 of FIG. 1 may include a DCI component 199 configured to transmit DCI to a UE, where the DCI includes power control parameters based on whether a first or a second power control mode is to be used at the UE.

The base station 102/180 may transmit DCI to the UE. The DCI may indicate a HARQ process number and at least one of a first set of power control parameters for a first power control mode or a second set of power control parameters for a second power control mode. The base station 102/180 may receive information transmitted on a PUSCH from the UE. The transmission of information on the PUSCH being associated with the first set of power control parameters or the second set of power control parameters. The information received on the PUSCH by the base station 102/180 may include data and/or control information. For example, the information may include some HARQ information, such as HARQ feedback indicating ACK or NACK.

Although the following description may be focused on 5G NR, the concepts described herein may be applicable to other similar areas, such as LTE, LTE-Advanced (LTE-A), CDMA, Global System for Mobile communications (GSM), and/or other wireless technologies.

Figure 2:
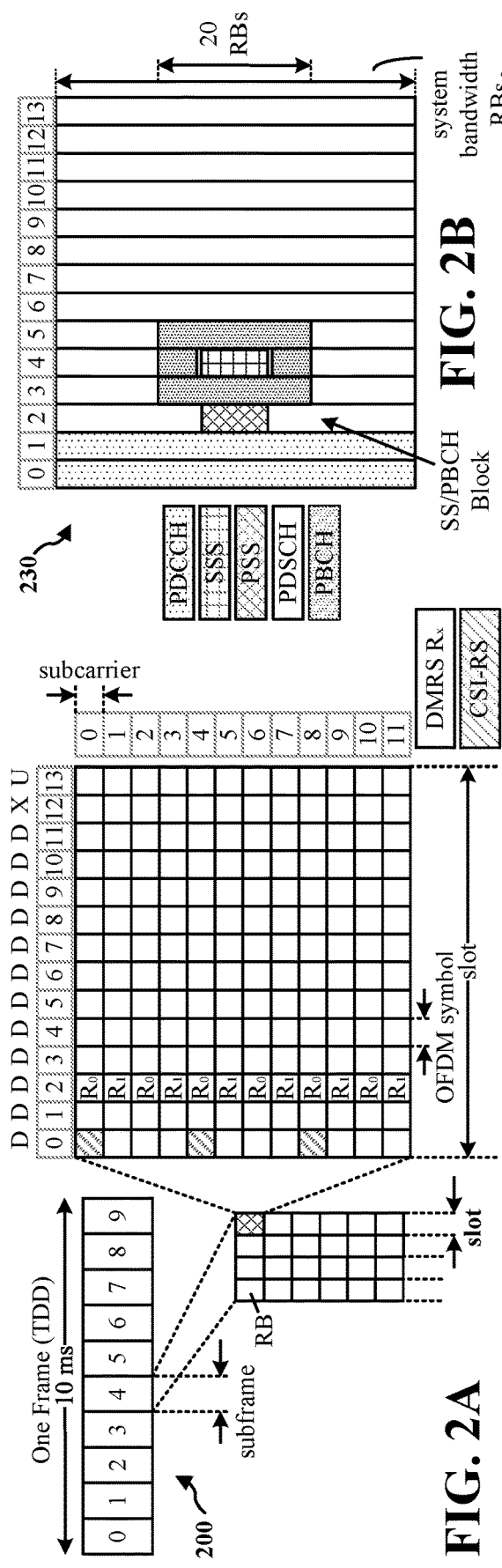
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
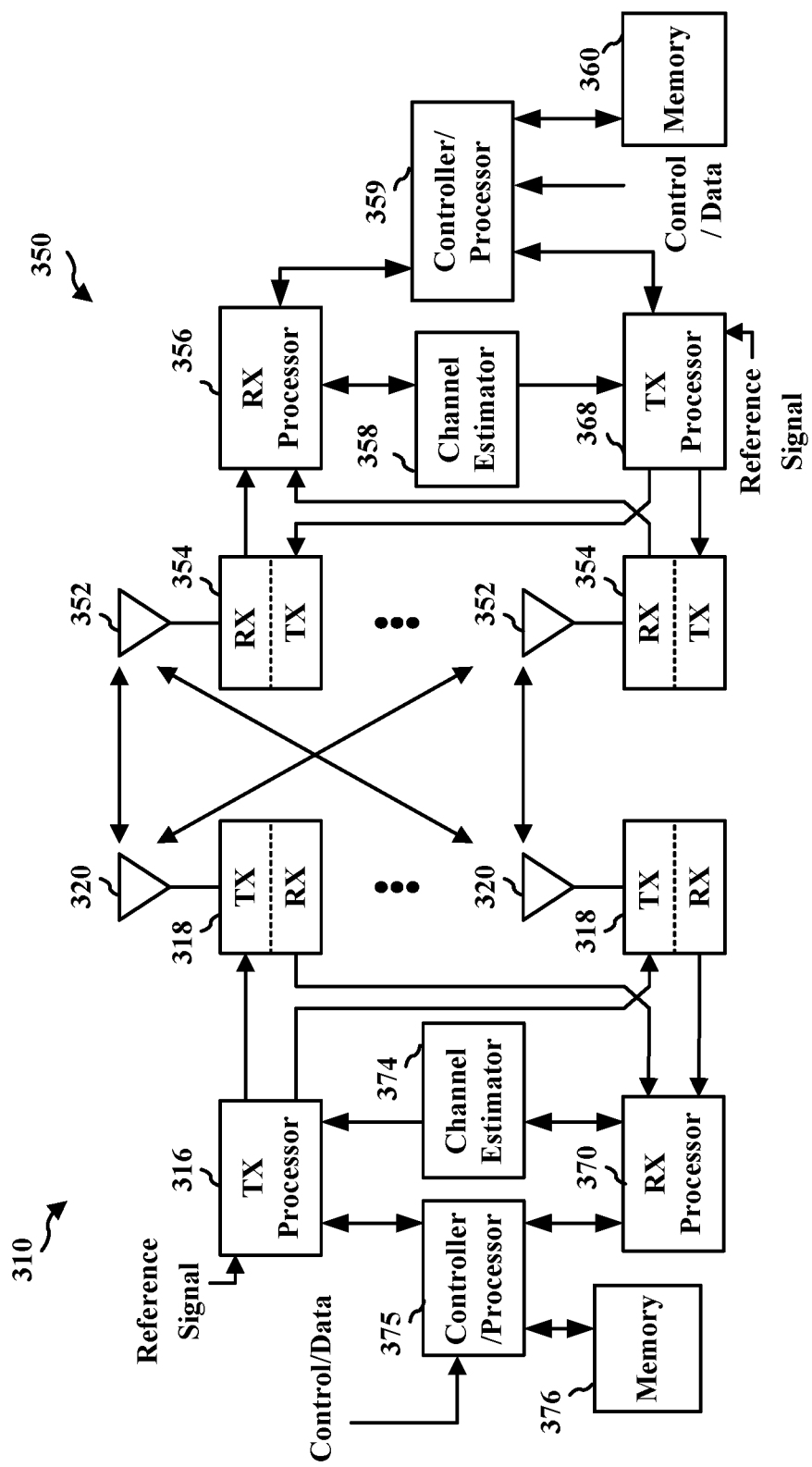
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

In some wireless communication systems, an access network may provide a UE with an indication of at least one uplink power control parameter via at least one SRS resource indicator (SRI). According to some aspects, each of a set of power control parameters may correspond to a respective type of SRI. For example, a set of power control parameters may include a power control parameter that corresponds to an identifier (ID) and associated downlink reference signal, e.g., for path loss configured in the primary cell for a secondary cell indicated by an SRS resource configuration, such as SRI-PUSCH-PathlossReferenceRS-Id. Further, the set of power control parameters may include various power control parameters configured in a serving cell, such as at least one open-loop power control parameter (e.g., SRI-P0-PUSCH-AlphaSetId), and/or closed-loop power control parameter (e.g., SRI-PUSCH-ClosedLoopIndex).

A UE may receive some or all of the foregoing power control parameters via RRC signaling or another type of signaling. Potentially, an SRI may include a set of uplink power control parameters, and the UE may be configured with multiple different SRIs. Each of the multiple SRIs may be associated with a respective beam of a set of multiple different beams. Therefore, a set of uplink power control parameters configured through an SRI may be beam-specific, e.g., so that the UE may apply an appropriate set of uplink power control parameters when transmitting via an associated beam.

In some networks, such as a non-terrestrial network (NTN), a UE may be configured to provide some ACK and/or NACK feedback on one or more HARQ processes. As such feedback has the potential to become lost or corrupted, e.g., during over-the-air transmission, the UE may be further configured for HARQ retransmission. In particular, HARQ retransmission may be semi-statically configured as enabled or disabled for each HARQ process.

In some communications systems and/or access networks, UEs may be connected with a base station using single beam (e.g., for at least uplink communication), e.g., when the HARQ retransmission is enable or disabled at the UE. However, in some NTNs, PUSCH transmission may be configured with carrier aggregation and/or time-overlapping PUSCH allocations. HARQ retransmission may be differently configured for different component carriers in carrier aggregation and/or different time resources (e.g., symbols, slots, etc.) for time-overlapping PUSCH allocations. HARQ retransmission configurations may affect the prioritization among the component carriers and/or the PUSCH allocations/scheduling. As such, a UE when performing power control, may need to consider whether HARQ retransmission is enabled or disabled when the UE is configured with carrier aggregation or time-overlapping PUSCH allocations/scheduling.

For uplink communications, information (e.g., data and/or control information) to be transmitted may not be buffered when HARQ retransmission is disabled for the corresponding HARQ process, e.g., due to the relatively long duration of delays associated with geostationary satellites, which may include delays of approximately 500 ms. Enabling HARQ retransmissions with relatively long delays may impact retransmission, such that the reliability of the transmission is reduced. As such, HARQ retransmissions may be disabled in some instances (e.g., with relatively long delays), and instead, modulation and coding schemes and/or related optimizations may be relied upon to provide reliable delivery of information (e.g., data and/or control information), e.g., within some latency constraints.

Specifically, different block error rates (BLER) may be targeted for different transmissions based on whether HARQ retransmission is enabled or disabled. In some instances, a BLER of $10^{-5}$ may be configured for a HARQ process having HARQ retransmission disabled, whereas a BLER of $10^{-1}$ may be configured for a HARQ process having HARQ retransmission enabled.

The reliability of a transmission, e.g., as represented by BLER, may be affected by the transmission power used for the transmission. Therefore, different sets of uplink power control parameters may impact the reliability of different transmissions. Therefore, a need exists for configuring different sets of uplink power control parameters according to different reliability objectives and/or constraints (e.g., as represented by BLER).

The present disclosure describes various techniques and approaches to configuring different sets of uplink power control parameters to be applied in different instances. Specifically, sets of uplink power control parameters may be configured for use when HARQ retransmission is enabled or disabled. For example, a UE may transmit information on a PUSCH based on a first set of power control parameters that corresponds to a first power control mode (e.g., a power control mode when HARQ retransmission is disabled), and may transmit information on a PUSCH based on a second set of power control parameters that corresponds to a second power control mode (e.g., a power control mode when HARQ retransmission is enabled). Accordingly, a UE may apply a set of uplink power control parameters based on whether HARQ retransmission is enabled or disabled, e.g., for a HARQ process associated with the transmission by the UE. Such applications of sets of uplink power control parameters based on whether HARQ retransmission is enabled or disabled may improve the reliability of uplink transmissions, e.g., so that BLER targets for transmissions can be met by a UE.

Figure 4:
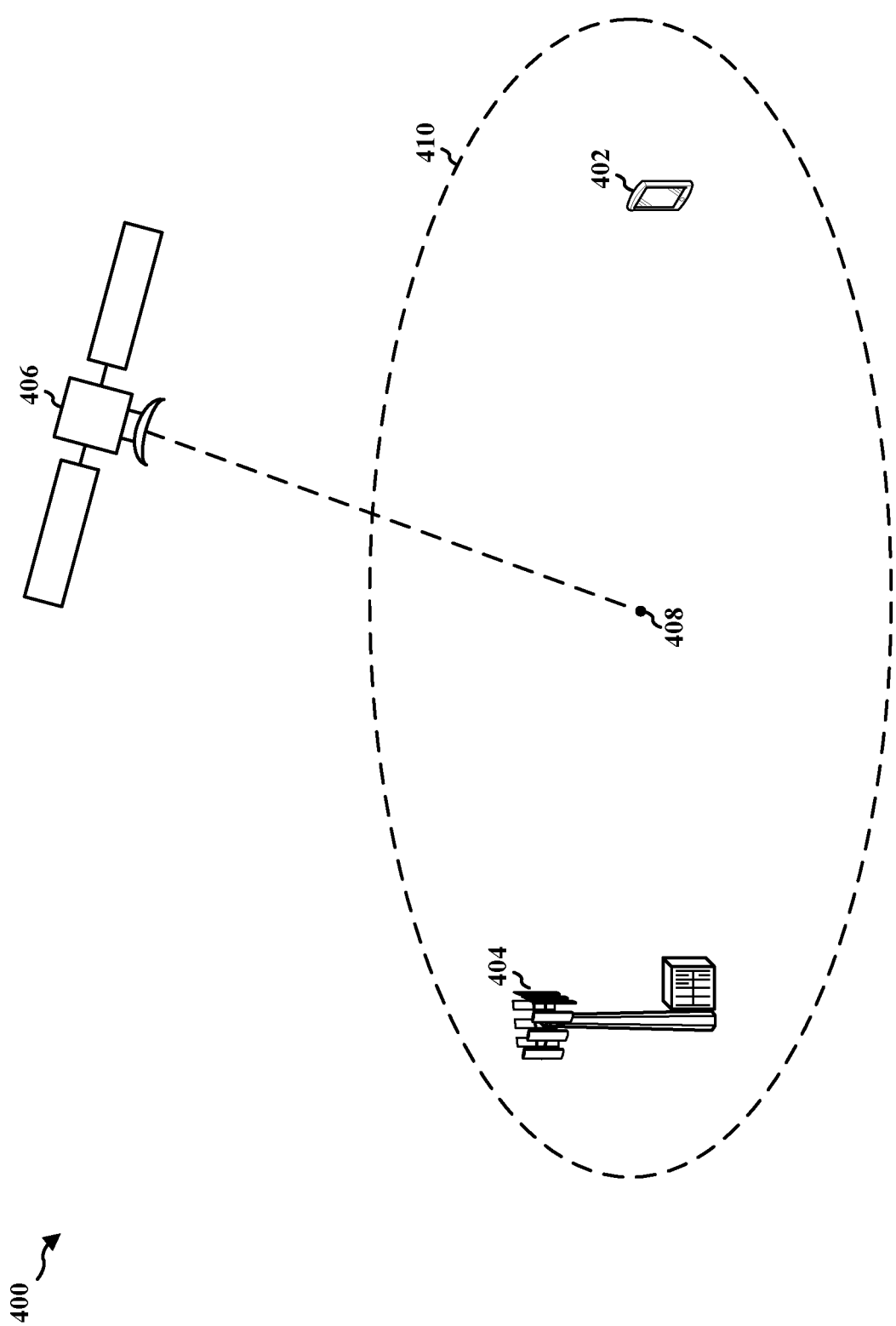
FIG. 4 is a diagram illustrating an example of a wireless communication system.

FIG. 4 is a diagram 400 of a wireless communication system (e.g., NTN). The diagram 400 of FIG. 4 comprises a UE 402, a base station 404, and a satellite 406. The satellite 406 may be orbiting around the Earth (e.g., geosynchronous orbit, mid Earth orbit, or low Earth orbit). The satellite 406 may relay communications between base stations (e.g., 404) and UEs (e.g., 402) located on Earth. In some aspects, the UE 402 may directly communicate with the satellite 406. The satellite 406 may transmit a transmission beam towards Earth and provide a beam footprint 410. In aspects where the satellite 406 is relaying communications between base stations and UEs, base stations located within the beam footprint 410 may receive network access via the satellite 406. In some aspects, UEs within the beam footprint 410 may communicate with the satellite 406. In some aspects of NTN systems, the satellite 406 may be a balloon or other non-terrestrial device that is orbiting the Earth, and the disclosure is not intended to be limited to aspects provided herein.

Figure 5:
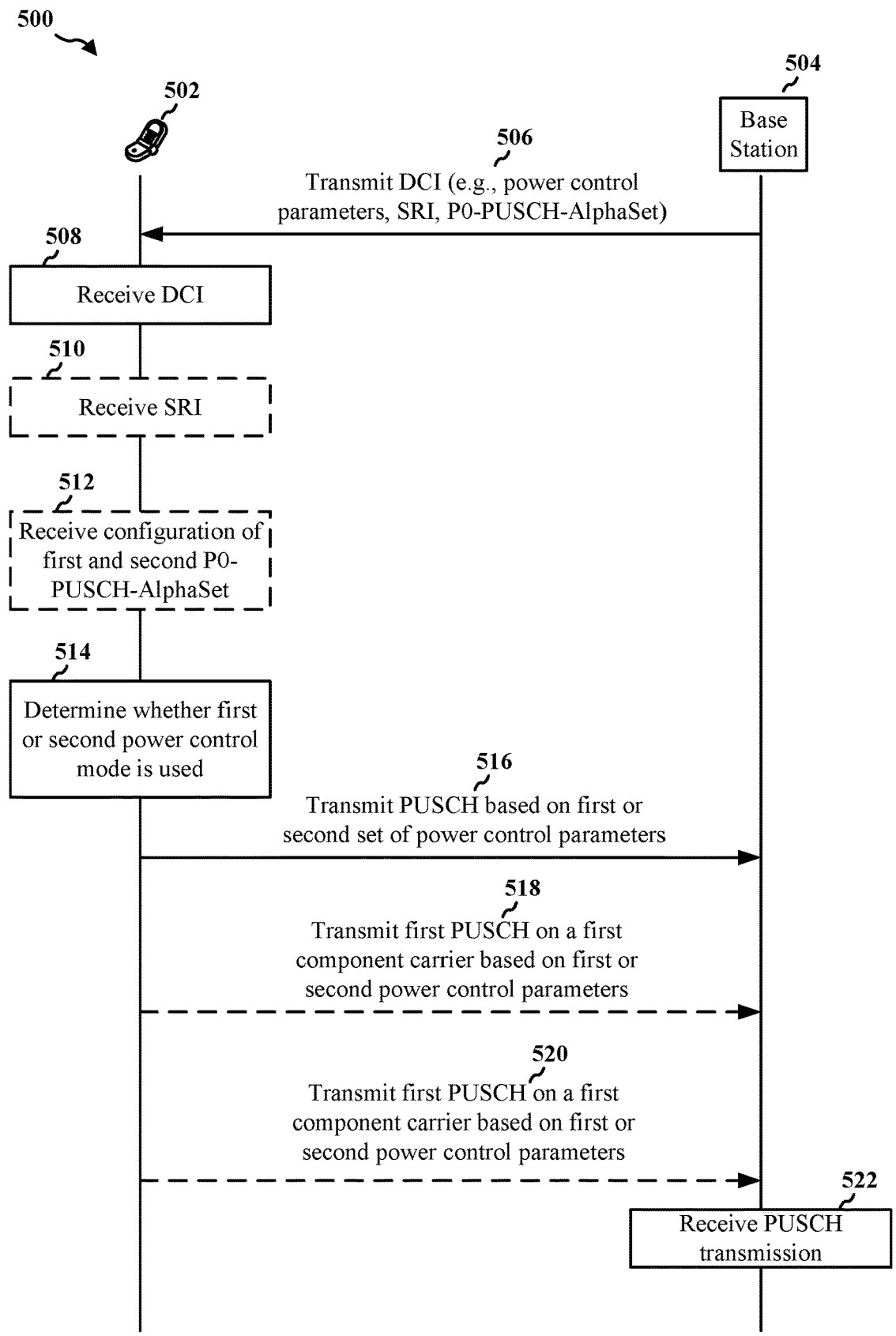
FIG. 5 is a call flow diagram of signaling between a UE and a base station in accordance with certain aspects of the disclosure.

FIG. 5 illustrates an example communication flow 500 between a UE 502 and a base station 504. Optional aspects are illustrated with a dashed line. The base station 504 may provide a cell serving the UE 502. For example, in the context of FIG. 1, the base station 504 may correspond to base station 102/180 and, accordingly, the cell may provide a geographic coverage area 110 in which communication coverage is provided and/or small cell 102' having a coverage area 110'. Further, the UE 502 may correspond to at least UE 104. In another example, in the context of FIG. 3, the base station 504 may correspond to the base station 310 and the UE 502 may correspond to the UE 350. In yet another example, in the context of FIG. 4, the base station 504 may correspond to the satellite 406. In yet another example, in the context of FIG. 4, the base station 504 may correspond to the base station 404, and the satellite 406 may serve as a relay. The satellite 406 may provide a coverage area in the form of a beam footprint 410 that serves the UE 502. The beam footprint 410 may provide a geographic coverage area in which communication coverage is provided based on the beam footprint 410. The UE 502 may correspond to the UE 402.

The base station 504, at 506, may transmit DCI to the UE 502. The DCI may include uplink power control parameters based on whether HARQ retransmission is enabled or disabled at the UE. The DCI may indicate a HARQ process number and at least one of a first set of power control parameters for when a first power control mode is used. The DCI may indicate a second set of power control parameters for when a second power control mode is used. In some aspects, the first set of power control parameters for when the first power control mode is used and the second set of power control parameters for when second power control mode is used may be pre-configured. The DCI may indicate one of the first set of power control parameters of the second set of power control parameters for use when transmitting information on the PUSCH. In some aspects, the base station 504 may be an NTN base station. In some aspects, the power control parameters may comprise at least one of SRI-PUSCH-PathlossReferenceRS-Id, SRI-P0-PUSCH-AlphaSetId, or SRI-PUSCH-ClosedLoopIndex. In some aspects, the DCI may indicate that the first power control mode may be used if a retransmission of a HARQ process is disabled at the UE 502. In some aspects, the DCI may indicate that the second power control mode may be used if the retransmission of the HARQ process is enabled at the UE 502. In some aspects, a respective power control mode may be configured by the network for each respective HARQ process.

In some aspects, the transmission 506 of the DCI may include transmitting at least one SRI through the DCI. In some aspects, the at least one SRI may be associated with the first set of power control parameters for when the first power control mode is used at the UE 502. In some aspects, the at least one SRI may be associated with the second set of power control parameters for when the second power control mode is used at the UE 502. In some aspects, the at least one SRI may be associated with SRI PUSCH power control (SRI-PUSCH-PowerControl), and the SRI-PUSCH-Power-Control may be associated with both the first set of power control parameters and the second set of power control parameters. In some aspects, the first set of power control parameters and the second set of power control parameters may share the same value for one or more of the power control parameters. In some aspects, the at least one SRI may comprise a first SRI-PUSCH-PowerControl and a second SRI-PUSCH-PowerControl, where the first SRI-PUSCH-PowerControl may be associated with the first set of power control parameters and the second SRI-PUSCH-PowerControl may be associated with the second set of power control parameters.

In some aspects, the base station 504 may transmit a configuration of a first P0-PUSCH-AlphaSet and a second P0-PUSCH-AlphaSet. The first P0-PUSCH-AlphaSet may include the first set of power control parameters for when the first power control mode is used at the UE 502. The second P0-PUSCH-AlphaSet may include the second set of power control parameters for when the second power control mode is used at the UE 502. In some aspects, the DCI may indicate one of the first P0-PUSCH-AlphaSet or the second P0-PUSCH-AlphaSet.

The UE 502, at 508, may receive the DCI from the base station 504. As discussed above, the DCI may indicate a HARQ process number and at least one of a first set of power control parameters for a first power control mode or a second set of power control parameters for a second power control mode.

The UE 502, at 510, may receive at least one SRI through the DCI. The at least one SRI may be associated with the first set of power control parameters for when the first power control mode is used. The at least one SRI may be associated with the second set of power control parameters for when the second power control mode is used. In some aspects, the at least one SRI may be associated with one SRI-PUSCH-PowerControl, and the SRI-PUSCH-PowerControl may be associated with both the first set of power control parameters and the second set of power control parameters. In some aspects, the first set of power control parameters and the second set of power control parameters may share the same value for one or more of the power control parameters. In some aspects, the at least one SRI may be associated with a first SRI-PUSCH-PowerControl and a second SRI-PUSCH-PowerControl. The first SRI-PUSCH-PowerControl may be associated with the first set of power control parameters, and the second SRI-PUSCH-PowerControl may be associated with the second set of power control parameters.

The UE 502, at 512, may receive a configuration for a first and second P0-PUSCH-AlphaSet. The first P0-PUSCH-AlphaSet may include the first set of power control parameters for when the first power control mode is used. The second P0-PUSCH-AlphaSet may include the second set of power control parameters for when the second power control mode is used. In some aspects, the DCI may indicate one of the first P0-PUSCH-AlphaSet or the second P0-PUSCH-AlphaSet.

The UE 502 may then, at 514, determine whether the first or second power control mode is to be used. The power control parameters used for uplink transmission by the UE may be based on whether the first or second power control mode is to be used at the UE.

The UE 502, at 516, may transmit information on a PUSCH based on the first set of power control parameters or the second set of power control parameters. The information transmitted by the UE 502 may include data and/or control information. In some aspects, the information may include HARQ information, such as HARQ ACK/NACK feedback. For example, the information may include data with HARQ information.

Transmission of the information on the PUSCH based on the first set of power control parameters or the second set of power control parameters may be based on the determination whether the first or second power control mode is to be used. In some aspects, the first power control mode may be used to transmit the information on the PUSCH if a retransmission of a HARQ process is disabled. In some aspects, the second power control mode may be used to transmit the information on the PUSCH if the retransmission of the HARQ process is enabled. A respective power control mode may be configured by the network for each respective HARQ process. In some aspects, the first set of power control parameters for when the first power control mode is used and the second set of power control parameters for when the second power control mode is used may be preconfigured. The DCI may indicate one of the first set of power control parameters or the second set of power control parameters to use to transmit the information on the PUSCH. In some aspects, transmission of the information on the PUSCH may comprise transmitting the information on the PUSCH based on the indicated one of the first P0-PUSCH-AlphaSet or the second P0-PUSCH-AlphaSet.

In some aspects, the UE 502, at 518, may transmit a first signal or information on a first PUSCH on a first component carrier. Transmitting the first signal or information on the first PUSCH on the first component carrier may be based on one of the first set of power control parameters or the second set of power control parameters based on whether the first power control mode or the second power control mode is used for the first component carrier.

In some aspects, the UE 502, at 520, may transmit a second signal or information on a second PUSCH on a second component carrier. Transmitting the second signal or information on the second PUSCH on the second component carrier may be based on one of the first set of power control parameters or the second set of power control parameters based on whether the first power control mode or the second power control mode is used for the second component carrier. In some aspects, the first signal or information on the first PUSCH and the second signal or information on the second PUSCH may be transmitted concurrently in time. In some aspects, the first signal or information on the first PUSCH may be transmitted with a higher priority than the second signal or information on the second PUSCH when the first power control mode is used on the first component carrier and the second power control mode is used on the second component carrier. In some aspects, the first signal or information on the first PUSCH may be transmitted with a lower priority than the second signal or information on the second PUSCH when the second power control mode is used on the first component carrier and the first power control mode is used on the second component carrier.

Figure 6:
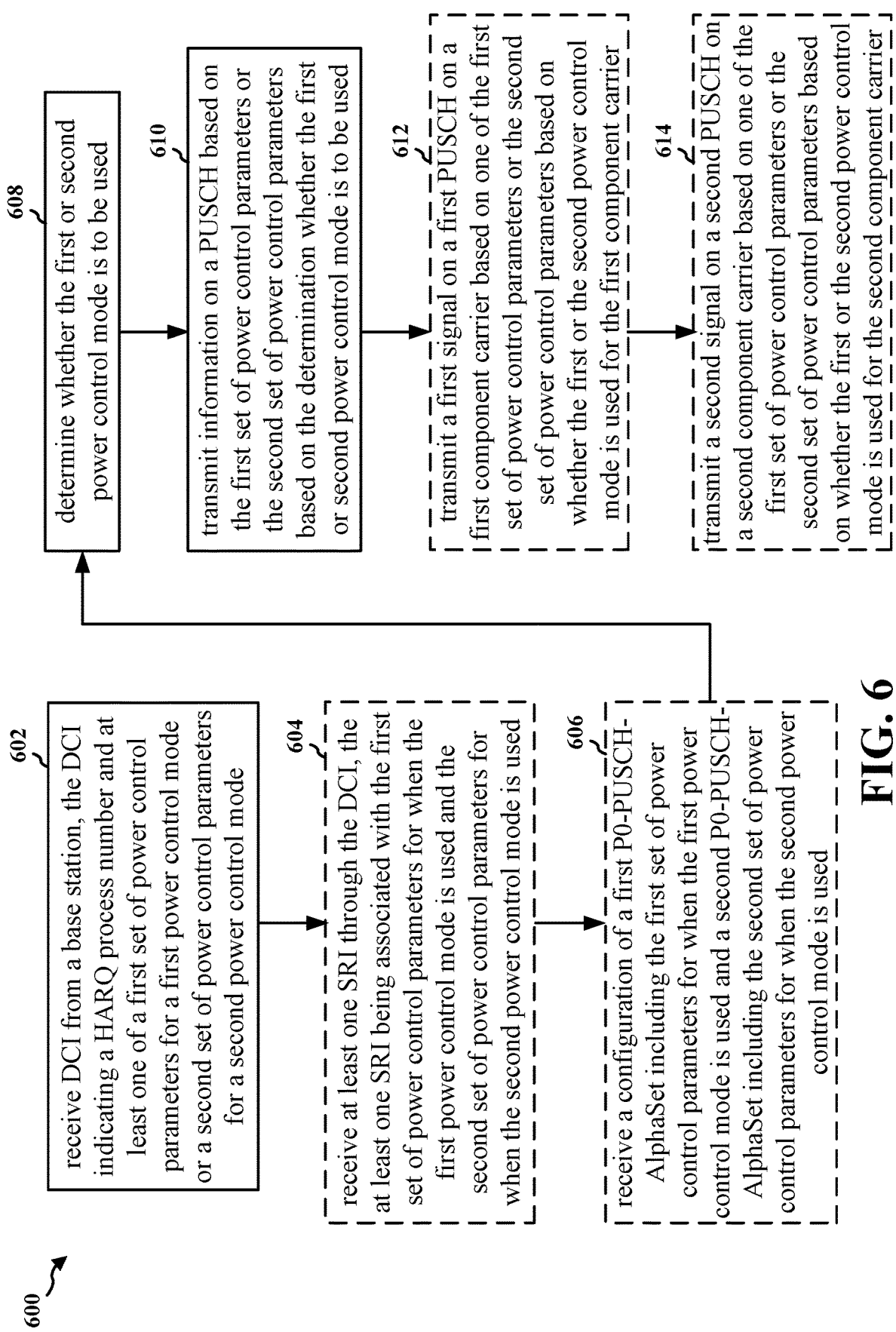
FIG. 6 is a flowchart of a method of wireless communication.

FIG. 6 is a flowchart of a method 600 of wireless communication. The method 600 may be performed by a UE or a component of a UE (e.g., the UE 104, 350, 402, 502, 1050; the apparatus 702/702'; the processing system 814, which may include the memory 360 and which may be the entire UE 350 or a component of the UE 350, such as the TX processor 368, the RX processor 356, and/or the controller/processor 359). According to various aspects, one or more of the illustrated operations of method 600 may be omitted, transposed, and/or contemporaneously performed. For example, some operations illustrated with a dashed line may be omitted in some aspects. The method 600 may enable a UE to utilize uplink power control parameters for when HARQ retransmission or HARQ feedback is enabled or disabled.

At 602, the UE may receive DCI from a base station. The DCI may indicate a HARQ process number and at least one of a first set of power control parameters for a first power control mode or a second set of power control parameters for a second power control mode. In some aspects, the base station may be an NTN base station. In some aspects, the power control parameters may comprise at least one of SRI PUSCH pathloss reference reference signal identifier (SRI-PUSCH-PathlossReferenceRS-Id), SRI P0 PUSCH Alpha Set identifier (SRI-P0-PUSCH-AlphaSetId), or SRI PUSCH closed loop index (SRI-PUSCH-ClosedLoopIndex).

Figure 7:
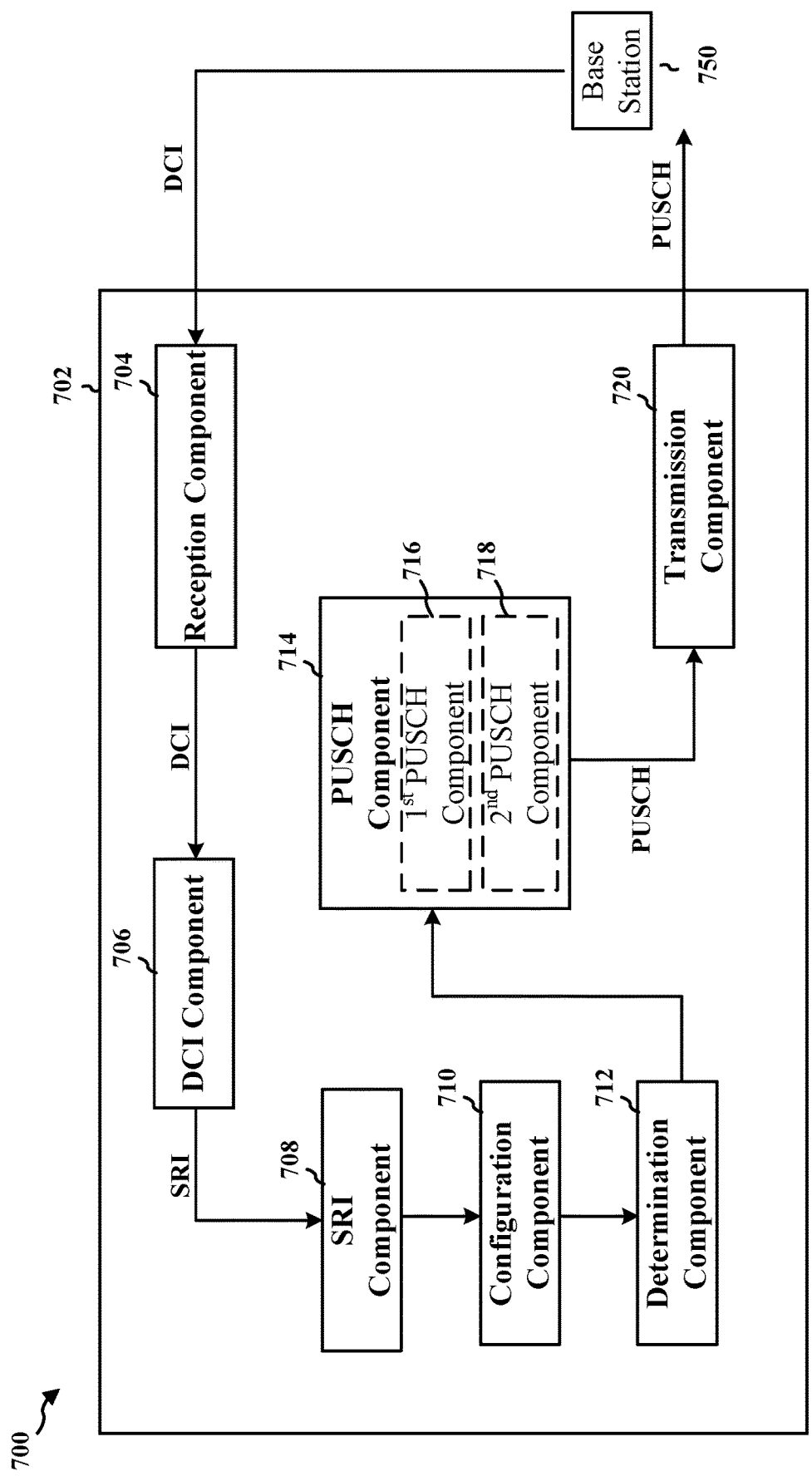
FIG. 7 is a conceptual data flow diagram illustrating the data flow between different means/components in an example apparatus.

In the context of FIG. 5, the UE 502 may perform 602, such as when the UE 502 receives DCI from the base station 504, as shown at 508. In the context of FIG. 7, a DCI component 706 of apparatus 702 may perform 602.

In some aspects, for example at 604, the UE, when receiving the DCI, may receive at least one SRS resource indicator (SRI) through the DCI. The at least one SRI may be associated with the first set of power control parameters for when the first power control mode is used. The at least one SRI may be associated with the second set of power control parameters for when the second power control mode is used. In some aspects, the at least one SRI may be associated with one SRI-PUSCH-PowerControl, and the SRI-PUSCH-PowerControl may be associated with both the first set of power control parameters and the second set of power control parameters. In some aspects, the first set of power control parameters and the second set of power control parameters may share the same value for one or more of the power control parameters. In some aspects, the at least one SRI may be associated with a first SRI-PUSCH-PowerControl and a second SRI-PUSCH-PowerControl. The first SRI-PUSCH-PowerControl may be associated with the first set of power control parameters, and the second SRI-PUSCH-PowerControl may be associated with the second set of power control parameters.

In the context of FIG. 5, the UE 502 may perform 604, such as when the UE 502 receives SRI from the base station 504, as shown at 510. In the context of FIG. 7, a SRI component 708 of apparatus 702 may perform 604.

In some aspects, for example at 606, the UE may receive a configuration for a first P0 PUSCH Alpha Set (P0-PUSCH-AlphaSet) and a second P0-PUSCH-AlphaSet. The first P0-PUSCH-AlphaSet may include the first set of power control parameters for when the first power control mode is used. The second P0-PUSCH-AlphaSet may include the second set of power control parameters for when the second power control mode is used. In some aspects, the DCI may indicate one of the first P0-PUSCH-AlphaSet or the second P0-PUSCH-AlphaSet.

In the context of FIG. 5, the UE 502 may perform 606, such as when the UE 502 receives a configuration of a first P0-PUSCH-AlphaSet and a second P0-PUSCH-AlphaSet from the base station 504, as shown at 512. In the context of FIG. 7, a configuration component 710 of apparatus 702 may perform 606.

At 608, the UE may determine whether the first or the second power control mode is to be used. In some aspects, the UE may determine whether the first or the second power control mode is to be used by, first, determining the HARQ process for which the UE is to transmit some information (e.g., data and/or control information), second, determining whether HARQ retransmission is enabled or disabled for the determined HARQ process, and third, selecting one of the first power control mode or the second power control mode based on whether HARQ retransmission is enabled for disabled for the determined HARQ process. For example, the UE may select the first power control mode when HARQ retransmission is disabled for the determined HARQ process, and the UE may select the second power control mode when HARQ retransmission is enabled for the determined HARQ process. The power control parameters used for uplink transmission by the UE may be based on whether the first or second power control mode is to be used at the UE.

In the context of FIG. 5, the UE 502 may perform 608, such as when the UE 502 determines whether a first power control mode or a second power control mode is to be used, as shown at 514. In the context of FIG. 7, a determination component 712 of apparatus 702 may perform 608.

At 610, the UE may transmit information on a PUSCH based on the first set of power control parameters or the second set of power control parameters. Transmission of the information on the PUSCH based on the first set of power control parameters or the second set of power control parameters may be based on the determination whether the first or second power control mode is to be used. In some aspects, the first set of power control parameters for when the first power control mode is used and the second set of power control parameters for when the second power control mode is used may be preconfigured.

The DCI may indicate one of the first set of power control parameters or the second set of power control parameters to use to transmit the information on the PUSCH. In some aspects, the first power control mode may be used to transmit the information on the PUSCH if a retransmission of a HARQ process is disabled. In some aspects, the second power control mode may be used to transmit the information on the PUSCH if the retransmission of the HARQ process is enabled.

In some aspects, the first power control mode may be used to transmit the information on the PUSCH if HARQ feedback for the HARQ process is disabled, while the second power control mode may be used to transmit the information on the PUSCH if the HARQ feedback for the HARQ process is enabled.

In some aspects, a respective power control mode may be configured by the network for each respective HARQ process. In some aspects, transmission of the information on the PUSCH may comprise transmitting the information on the PUSCH based on the indicated one of the first P0-PUSCH-AlphaSet or the second P0-PUSCH-AlphaSet.

In the context of FIG. 5, the UE 502 may perform 610, such as when the UE 502 transmits information (e.g., data and/or control information) on a PUSCH based on a first set of power control parameters or a second set of power control parameters, as shown at 516. In the context of FIG. 7, a PUSCH component 714 of apparatus 702 may perform 610.

In some aspects, for example at 612, to transmit the information on the PUSCH, the UE may transmit a first signal or information on a first PUSCH on a first component carrier. Transmitting the first signal or information on the first PUSCH on the first component carrier may be based on one of the first set of power control parameters or the second set of power control parameters based on whether the first power control mode or the second power control mode is used for the first component carrier.

In the context of FIG. 5, the UE 502 may perform 612, such as when the UE 502 transmits information (e.g., data and/or control information) on a first PUSCH on a first component carrier based on a first set of power control parameters or a second set of power control parameters, as shown at 518. In the context of FIG. 7, a $1^{st}$ PUSCH component 716 of apparatus 702 may perform 612.

In some aspects, for example at 614, to transmit the information on the PUSCH, the UE may transmit a second signal or information on a second PUSCH on a second component carrier. Transmitting the second signal or information on the second PUSCH on the second component carrier may be based on one of the first set of power control parameters or the second set of power control parameters based on whether the first power control mode or the second power control mode is used for the second component carrier. In some aspects, the first signal or information on the first PUSCH and the second signal or information on the second PUSCH may be transmitted concurrently in time. In some aspects, the first signal or information on the first PUSCH may be transmitted with a higher priority than the second signal or information on the second PUSCH when the first power control mode is used on the first component carrier and the second power control mode is used on the second component carrier. In some aspects, the first signal or information on the first PUSCH may be transmitted with a lower priority than the second signal or information on the second PUSCH when the second power control mode is used on the first component carrier and the first power control mode is used on the second component carrier.

In the context of FIG. 5, the UE 502 may perform 614, such as when the UE 502 transmits information (e.g., data and/or control information) on a second PUSCH on a second component carrier based on a first set of power control parameters or a second set of power control parameters, as shown at 520. In the context of FIG. 7, a $2^{nd}$ PUSCH component 718 of apparatus 702 may perform 614.

FIG. 7 is a conceptual data flow diagram 700 illustrating the data flow between different means/components in an example apparatus 702. The apparatus may be a UE or a component of a UE. The apparatus includes a reception component 704 that may be configured to receive various types of signals/messages and/or other information from other devices, including, for example, the base station 750. The apparatus includes a DCI component 706 that may be configured to receive DCI from a base station, e.g., as described in connection with 602 of FIG. 6. The apparatus includes an SRI component 708 that may be configured to receive at least one SRI through the DCI, e.g., as described in connection with 604 of FIG. 6. The apparatus includes a configuration component 710 that may be configured to receive a configuration for a first P0-PUSCH-AlphaSet and a second P0-PUSCH-AlphaSet, e.g., as described in connection with 606 of FIG. 6. The apparatus includes a determination component 712 that may be configured to determine whether the first or second power control mode is to be used, e.g., as described in connection with 608 of FIG. 6. The apparatus includes a PUSCH component 714 that may be configured to transmit information on a PUSCH based on the first set of power control parameters or the second set of power control parameters, e.g., as described in connection with 610 of FIG. 6. The apparatus includes a $1^{st}$ PUSCH component 716 that may be configured to transmit a first signal or information on a first PUSCH on a first component carrier, e.g., as described in connection with 612 of FIG. 6. The apparatus includes a $2^{nd}$ PUSCH component 718 that may be configured to transmit a second signal or information on a second PUSCH on a second component carrier, e.g., as described in connection with 614 of FIG. 6. The apparatus includes a transmission component 720 that may be configured to transmit various types of signals/messages and/or other information to other devices, including, for example, the base station 750.

The apparatus may include additional components that perform some or all of the blocks of the algorithms in the aforementioned call flow diagram of FIG. 5 and/or flowchart of FIG. 6. As such, some or all of the blocks in the aforementioned call flow diagram of FIG. 5 and/or flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
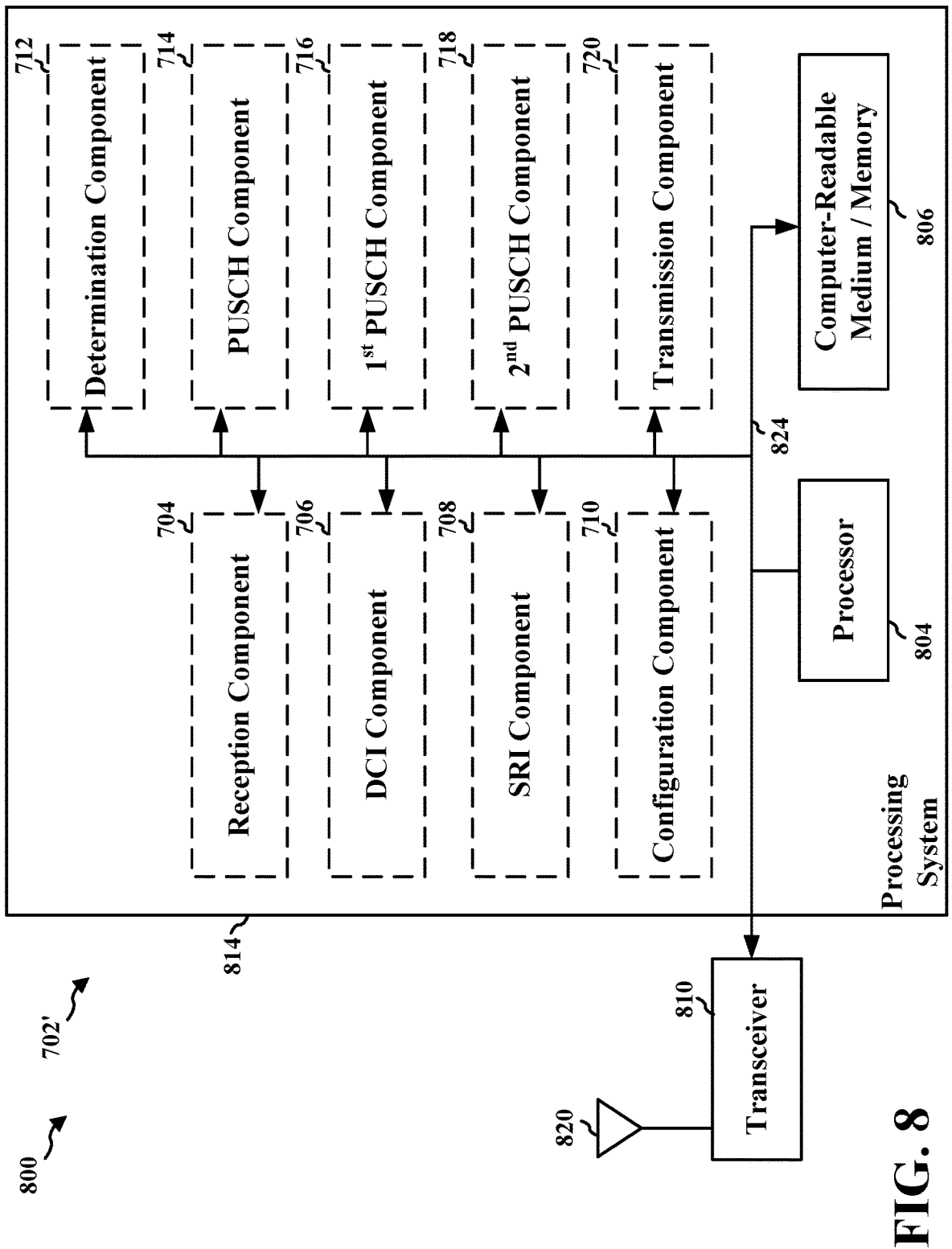
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, 716, 718, 720, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 720, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 710, 712, 714, 716, 718, 720. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359. Alternatively, the processing system 814 may be the entire UE (e.g., see 350 of FIG. 3).

In one configuration, the apparatus 702/702' for wireless communication includes means for receiving DCI from a base station. The DCI may indicate a HARQ process number and at least one of a first set of power control parameters for a first power control mode or a second set of power control parameters for a second power control mode. The apparatus 702/702' further includes means for determining whether the first or second power control mode is to be used. The apparatus 702/702' further includes means for transmitting PUSCH based on the first set of power control parameters or the second set of power control parameters based on the determination whether the first or second power control mode is to be used.

The apparatus 702/702' may further include means for receiving DCI configured to receive at least one SRI through the DCI. The at least one SRI may be associated with the first set of power control parameters for when the first power control mode is used and the second set of power control parameters for when the second power control mode is used. The apparatus 702/702' may further include means for receiving a configuration of a first P0-PUSCH-AlphaSet including the first set of power control parameters for when the first power control mode is used and a second P0-PUSCH-AlphaSet including the second set of power control parameters for when the second power control mode is used. The DCI may indicate one of the first P0-PUSCH-AlphaSet or the second P0-PUSCH-AlphaSet. The means for transmitting the information on the PUSCH may be configured to transmit the information on the PUSCH based on the indicated one of the first P0-PUSCH-AlphaSet or the second P0-PUSCH-AlphaSet.

The means for transmitting the information on the PUSCH may be configured to transmit a first signal on a first PUSCH on a first component carrier based on one of the first set of power control parameters or the second set of power control parameters based on whether the first power control mode or the second power control mode is used for the first component carrier, and may be further configured to transmit a second signal or information on a second PUSCH on a second component carrier based on one of the first set of power control parameters or the second set of power control parameters based on whether the first power control mode or the second power control mode is used for the second component carrier. The first signal or information on the first PUSCH and the second signal or information on the second PUSCH may be transmitted concurrently in time. The first signal or information on the first PUSCH may be transmitted with a higher priority than the second signal or information on the second PUSCH when the first power control mode is used on the first component carrier and the second power control mode is used on the second component carrier. The first signal or information on the first PUSCH may be transmitted with a lower priority than the second signal or information on the second PUSCH when the second power control mode is used on the first component carrier and the first power control mode is used on the second component carrier.

The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
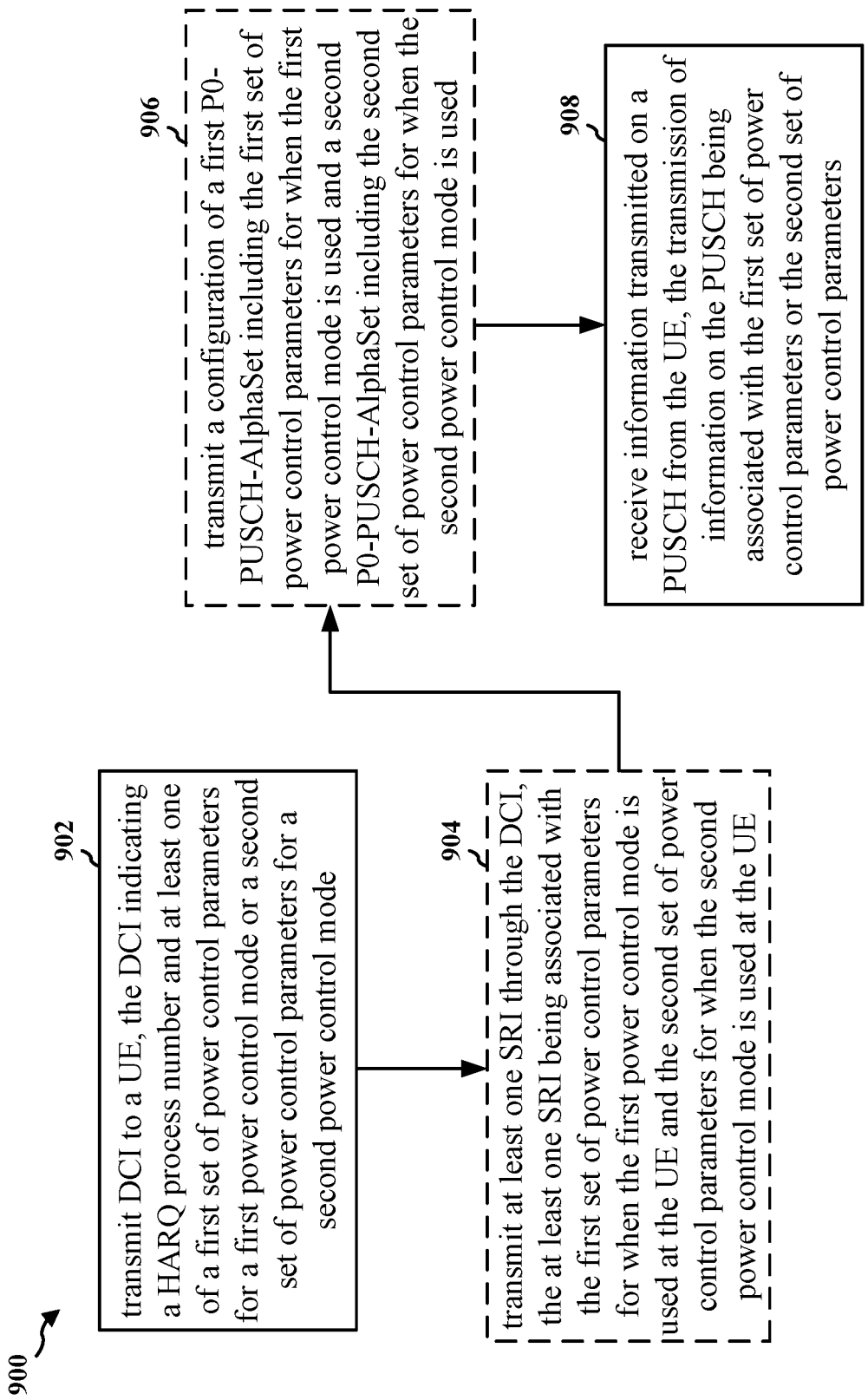
FIG. 9 is a flowchart of a method of wireless communication.

FIG. 9 is a flowchart of a method of wireless communication. The method 900 may be performed by a base station or a component of a base station (e.g., the base station 102, 180, 310, 404, 504, 750; the apparatus 1002/1002'; the processing system 1114, which may include the memory 376 and which may be the entire base station 310 or a component of the base station 310, such as the TX processor 316, the RX processor 370, and/or the controller/processor 375). According to various aspects, one or more of the illustrated operations of the method 900 may be omitted, transposed, and/or contemporaneously performed. For example, some operations illustrated with a dashed line may be omitted in some aspects. The method 900 may allow a base station to configure a UE with uplink power control parameters for when HARQ retransmission or HARQ feedback is enabled or disabled.

At 902, the base station may transmit DCI to a UE. The DCI may indicate a HARQ process number and at least one of a first set of power control parameters for a first power control mode or a second set of power control parameters for a second power control mode. In some aspects, the first set of power control parameters for when the first power control mode is used and the second set of power control parameters for when the second power control mode is used may be pre-configured.

The DCI may indicate one of the first set of power control parameters or the second set of power control parameters for use when transmitting the information on the PUSCH. In some aspects, the DCI may indicate that the first power control mode may be used if a retransmission of a HARQ process is disabled at the UE. In some aspects, the DCI may indicate that the second power control mode may be used if the retransmission of the HARQ process is enabled at the UE. In some other aspects, the DCI may indicate that the first power control mode is to be used if HARQ feedback for the HARQ process is disabled at the UE, and the DCI may further indicate that the second power control mode is to be used if the HARQ feedback for the HARQ process is enabled at the UE.

A respective power control mode may be configured by the network for each respective HARQ process. In some aspects, the base station may be an NTN base station. In some aspects, the power control parameters may comprise at least one of SRI-PUSCH-PathlossReferenceRS-Id, SRI-P0-PUSCH-AlphaSetId, or SRI-PUSCH-ClosedLoopIndex.

Figure 10:
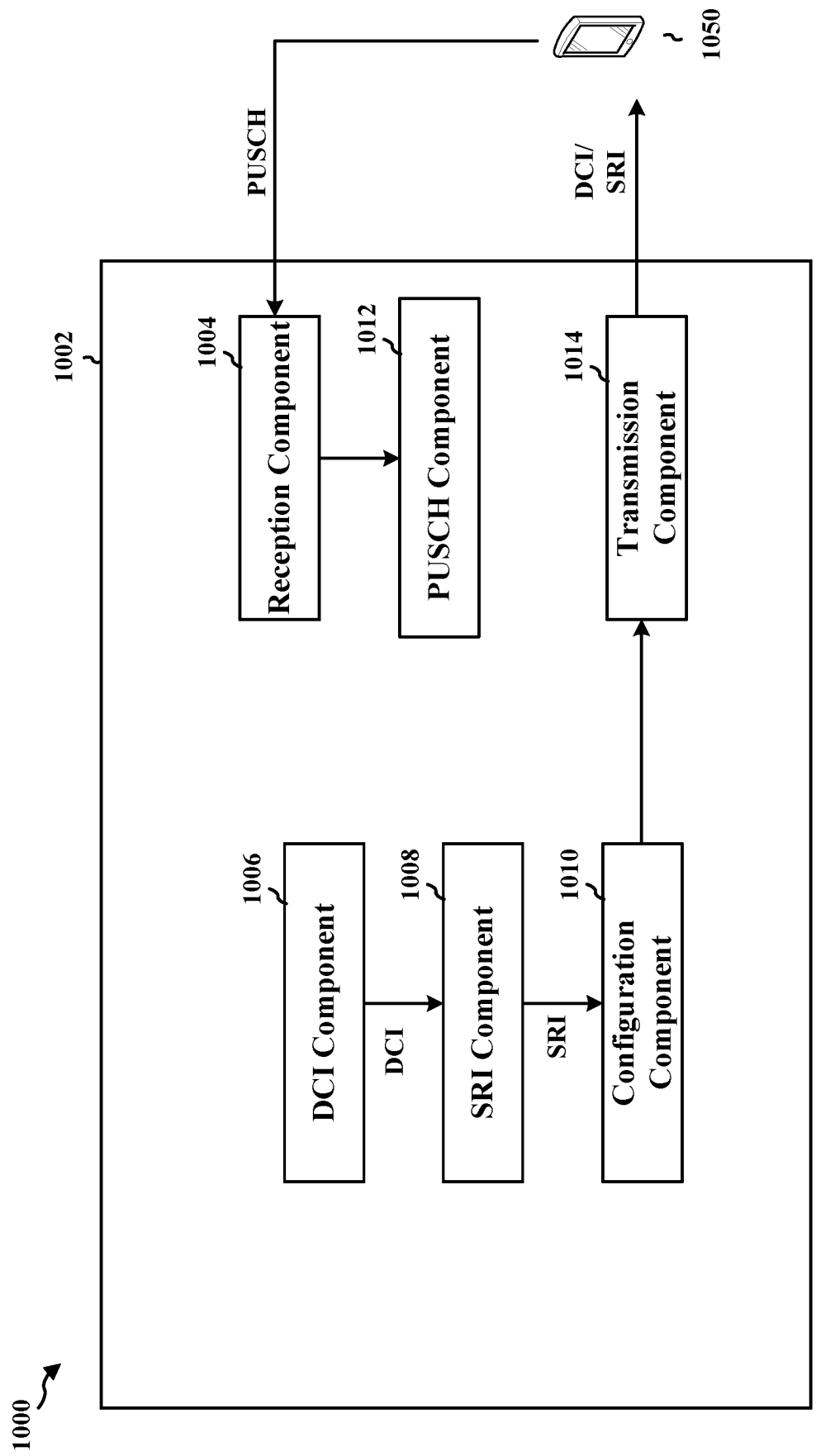
FIG. 10 is a conceptual data flow diagram illustrating the data flow between different means/components in an example apparatus.

In the context of FIG. 5, the base station 504 may perform 902, such as when the base station 504 transmits DCI to the UE 502, as shown at 506. In the context of FIG. 10, a DCI component 1006 of apparatus 1002 may perform 902.

In some aspects, for example at 904, when transmitting the DCI, the base station may transmit at least one SRI through the DCI. The at least one SRI may be associated with the first set of power control parameters for when the first power control mode is used at the UE and the second set of power control parameters for when the second power control mode is used at the UE. In some aspects, the at least one SRI may be associated with SRI PUSCH power control (SRI-PUSCH-PowerControl), and the SRI-PUSCH-PowerControl may be associated with both the first set of power control parameters and the second set of power control parameters. In some aspects, the first set of power control parameters and the second set of power control parameters may share the same value for one or more of the power control parameters. In some aspects, the at least one SRI may comprise a first SRI-PUSCH-PowerControl and a second SRI-PUSCH-PowerControl, where the first SRI-PUSCH-PowerControl may be associated with the first set of power control parameters and the second SRI-PUSCH-PowerControl may be associated with the second set of power control parameters.

In the context of FIG. 5, the base station 504 may perform 904, such as when the base station 504 transmits DCI to the UE 502, as shown at 506. In the context of FIG. 10, an SRI component 1008 of apparatus 1002 may perform 904.

In some aspects, for example at 906, the base station may transmit a configuration of a first P0-PUSCH-AlphaSet and a second P0-PUSCH-AlphaSet. The first P0-PUSCH-AlphaSet may include the first set of power control parameters for when the first power control mode is used at the UE. The second P0-PUSCH-AlphaSet may include the second set of power control parameters for when the second power control mode is used at the UE. In some aspects, the DCI may indicate one of the first P0-PUSCH-AlphaSet or the second P0-PUSCH-AlphaSet.

In the context of FIG. 5, the base station 504 may perform 906, such as when the base station 504 transmits DCI to the UE 502, as shown at 506. In the context of FIG. 10, a configuration component 1010 of apparatus 1002 may perform 906.

At 908, the base station may receive information transmitted on a PUSCH transmission from the UE. The transmission of the information on the PUSCH may be associated with the first set of power control parameters or the second set of power control parameters. In some aspects, the transmission of the information on the PUSCH may be associated with one of the first P0-PUSCH-AlphaSet or the second P0-PUSCH-AlphaSet.

In the context of FIG. 5, the base station 504 may perform 908, such as when the base station 504 receives information (e.g., data and/or control information) on a PUSCH (e.g., on first and second component carriers) from the UE 502, as shown at 522. In the context of FIG. 10, a PUSCH component 1012 of apparatus 1002 may perform 908.

FIG. 10 is a conceptual data flow diagram 1000 illustrating the data flow between different means/components in an example apparatus 1002. The apparatus may be a base station or a component of a base station. The apparatus includes a reception component 1004 that may be configured to receive various types of signals/messages and/or other information from other devices, including, for example, the UE 1050. The apparatus includes a DCI component 1006 that may be configured to transmit DCI to a UE, e.g., as described in connection with 902 of FIG. 9. The apparatus includes an SRI component 1008 that may be configured to transmit at least one SRI through DCI, e.g., as described in connection with 904 of FIG. 9. The apparatus includes a configuration component 1010 that may be configured to transmit a configuration for a first P0-PUSCH-AlphaSet and a second P0-PUSCH-AlphaSet, e.g., as described in connection with 906 of FIG. 9. The apparatus includes a PUSCH component 1012 that may be configured to receive information transmitted on a PUSCH from the UE, e.g., as described in connection with 908 of FIG. 9. The apparatus includes a transmission component 1014 that may be configured to transmit various types of signals/messages and/or other information to other devices, including, for example, the UE 1050.

The apparatus may include additional components that perform some or all of the blocks of the algorithms in the aforementioned call flow diagram of FIG. 5 and/or flowchart of FIG. 9. As such, some or all of the blocks in the aforementioned call flow diagram of FIG. 5 and/or flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
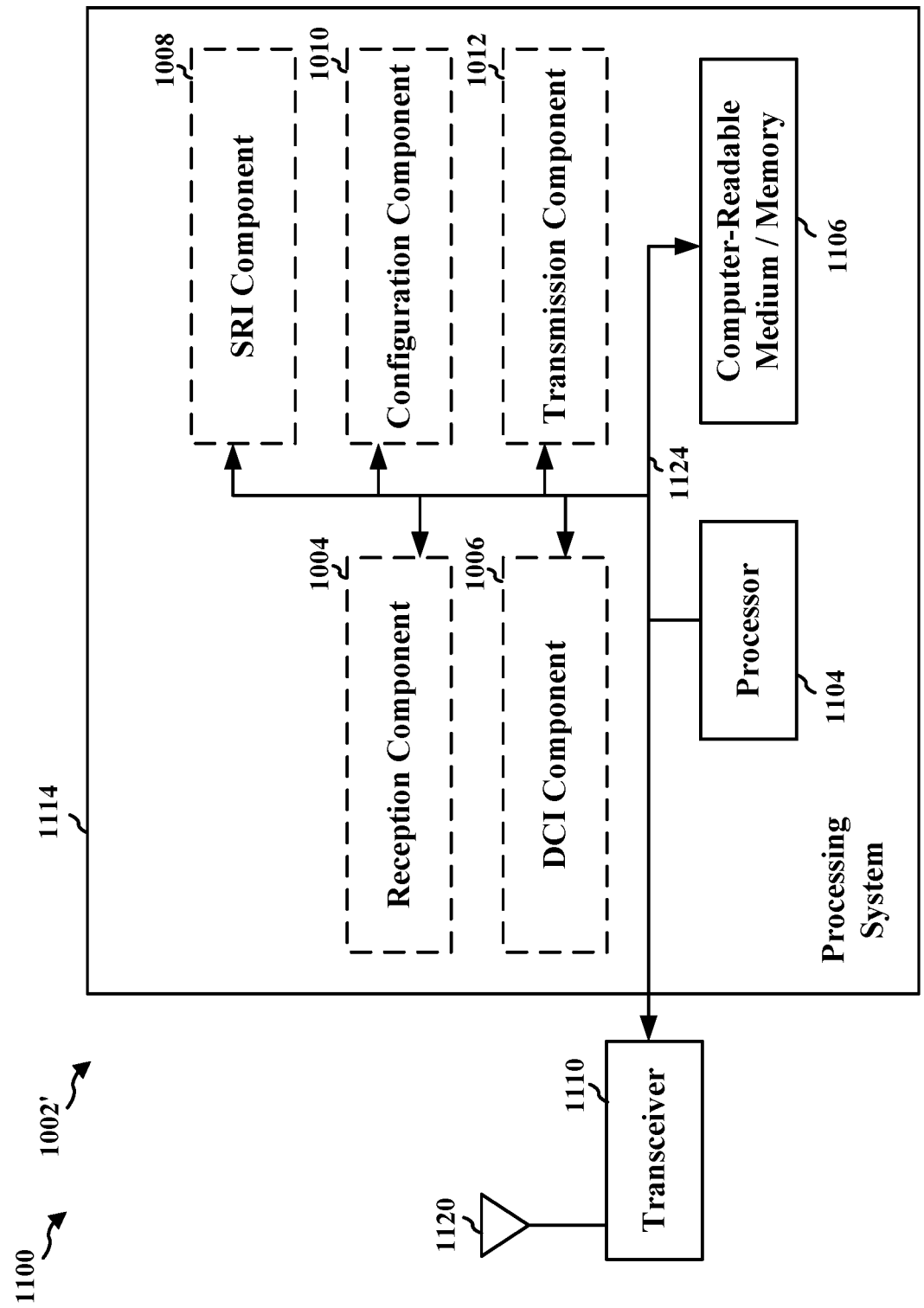
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, 1008, 1010, 1012, 1014, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1014, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006, 1008, 1010, 1012, 1014. The components may be software components running in the processor 1104, resident/stored in the computer readable medium/memory 1106, one or more hardware components coupled to the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the apparatus 1002/1002' for wireless communication includes means for transmitting DCI to a UE. The DCI may indicate a HARQ process number and at least one of a first set of power control parameters for a first power control mode or a second set of power control parameters for a second power control mode. The apparatus 1002/1002' further includes means for receiving information transmitted on a PUSCH from the UE. The transmission of the information on the PUSCH may be associated with the first set of power control parameters or the second set of power control parameters. The apparatus 1002/1002' further includes means for transmitting DCI configured to transmit at least one SRI through the DCI. The at least one SRI may be associated with the first set of power control parameters for when the first power control mode is used at the UE and the second set of power control parameters for when the second power control mode is used at the UE.

The apparatus 1002/1002' may further include means for transmitting a configuration of a first P0-PUSCH-AlphaSet including the first set of power control parameters for when the first power control mode is used and a second P0-PUSCH-AlphaSet including the second set of power control parameters for when the second power control mode is used. The DCI may indicate one of the first P0-PUSCH-AlphaSet or the second P0-PUSCH-AlphaSet. The transmission of the information on the PUSCH may be associated with one of the first P0-PUSCH-AlphaSet or the second P0-PUSCH-AlphaSet.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The present disclosure relates to providing uplink power control parameters in the form of a first power control mode or a second power control mode to a UE based on whether HARQ retransmission is enabled or disabled. In some aspects, the UE may transmit information on a PUSCH based on a first set of power control parameters that are configured for when the first power control mode is used. In some aspects, the UE may transmit information on a PUSCH based on a second set of power control parameters that are configured for when the second power control mode is used. At least one advantage of the disclosure is that the configuration of the HARQ process (e.g. HARQ retransmission or HARQ feedback) is taken into consideration when transmitting uplink transmissions. For example, power control parameters for instances for when HARQ retransmission is disabled may allow UEs to transmit at higher power levels, which may assist to ensure that the uplink transmission is received at the base station. At least another advantage of the disclosure is that component carriers may be prioritized based on which power control mode is used for the respective component carrier. For example, transmitting information on a component carrier with the first power control mode may have a higher priority than transmitting information on a component carrier with the second power control mode. This may allow for uplink power to be prioritized and allocated to transmitting information on the component carrier with the first power control mode, in instances where the transmission information on the component carriers may overlap. In yet another example, the transmission of information on a PUSCH with the second power control mode may have a lower priority than the transmission of information on another PUSCH with the first power control mode, where the transmission of information on the respective PUSCHs overlap in time.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
receiving at least one message indicating at least one of a first set of values corresponding to a set of power control parameters or a second set of values corresponding to the set of power control parameters, wherein the at least one message comprises at least one sounding reference signal (SRS) resource indicator (SRI) associated with an SRI physical uplink shared channel (PUSCH) power control (SRI-PUSCH-Power-Control) parameter of the set of power control parameters;
receiving downlink control information (DCI) indicating a hybrid automatic repeat request (HARQ) process number; and
transmitting information using the first set of values corresponding to the set of power control parameters or the second set of values corresponding to the set of power control parameters, said transmission being based on a HARQ configuration associated with the HARQ process number.

2. The method of claim 1, wherein the first set of values is used to transmit the information if retransmission of HARQ feedback associated with the HARQ process number is disabled by the HARQ configuration, and wherein the second set of values is used to transmit the information if retransmission of HARQ feedback associated with the HARQ process number is enabled by the HARQ configuration.

3. The method of claim 1, wherein the first set of values is used to transmit the information if HARQ feedback associated with the HARQ process number is disabled by the HARQ configuration, and wherein the second set of values is used to transmit the information if HARQ feedback associated with the HARQ process number is enabled by the HARQ configuration.

4. The method of claim 1, further comprising:
receiving, from a network, a respective at least one of the first set of values corresponding to the set of power control parameters or the second set of values corresponding to the set of power control parameters for each HARQ process of a set of HARQ processes configured for the UE.

5. The method of claim 1, wherein the at least one SRI is associated with at least one of the first set of values corresponding to the set of power control parameters or the second set of values corresponding to the set of power control parameters.

6. The method of claim 5, wherein the at least one SRI indicates the at least one of the first set of values corresponding to the set of power control parameters or the second set of values corresponding to the set of power control parameters.

7. The method of claim 1, wherein at least one value of the first set of values corresponding to at least one power control parameter of the set of power control parameters is equal to at least one value of the second set of values corresponding to the at least one power control parameter of the set of power control parameters.

8. The method of claim 1, wherein the at least one message further indicates a first P0 PUSCH Alpha Set (P0-PUSCH-AlphaSet) including the first set of values corresponding to the set of power control parameters and also indicates a second P0-PUSCH-AlphaSet including the second set of values corresponding to the set of power control parameters, wherein the DCI further indicates one of the first P0-PUSCH-AlphaSet or the second P0-PUSCH-AlphaSet, and wherein the information is transmitted using the first set of values or the second set of values based on the indicated one of the first P0-PUSCH-AlphaSet or the second P0-PUSCH-AlphaSet.

9. The method of claim 1, wherein the first set of values corresponding to the set of power control parameters and the second set of values corresponding to the set of power control parameters are configured at the UE without being received from a network, and the DCI indicates one of the first set of values or the second set of values is to be used for transmitting the information.

10. The method of claim 1, wherein the transmitting the information comprises:
transmitting a first signal on a first component carrier using one of the first set of values corresponding to the set of power control parameters or the second set of values corresponding to the set of power control parameters, said transmission of the first signal being based on a first HARQ configuration associated with the first component carrier; and
transmitting a second signal on a second component carrier using one of the first set of values corresponding to the set of power control parameters or the second set of values corresponding to the set of power control parameters, said transmission of the second signal being based on a second HARQ configuration associated with the second component carrier, the first signal and the second signal being transmitted concurrently in time,
wherein one of the first signal or the second signal is associated with a first priority that is higher than a second priority associated with the other one of the first signal or the second signal, the first priority being based on the first HARQ configuration and the second priority being based on the second HARQ configuration.

11. The method of claim 1, wherein the set of power control parameters comprises at least one of an SRI PUSCH pathloss reference signal (RS) identifier (ID) (SRI-PUSCH-PathlossReferenceRS-Id), an SRI P0 PUSCH Alpha Set ID (SRI-P0-PUSCH-AlphaSetId), or an SRI PUSCH Closed Loop Index (SRI-PUSCH-ClosedLoopIndex).

12. A method of wireless communication at a base station, comprising:
   transmitting, to a user equipment (UE), at least one message indicating at least one of a first set of values corresponding to a set of power control parameters or a second set of values corresponding to the set of power control parameters, wherein the at least one message comprises at least one sounding reference signals (SRS) resource indicator (SRI) associated with an SRI physical uplink shared channel (PUSCH) power control (SRI-PUSCH-PowerControl) parameter of the set of power control parameters;
   transmitting, to the UE, downlink control information (DCI) indicating a hybrid automatic repeat request (HARQ) process number; and
   receiving, from the UE, a transmission of information associated with the first set of values corresponding to the set of power control parameters or the second set of values corresponding to the set of power control parameters based on a HARQ configuration associated with the HARQ process number.

13. The method of claim 12, wherein the first set of values is to be used if retransmission of HARQ feedback associated with the HARQ process number is disabled by the HARQ configuration, and wherein the second set of values is to be used if retransmission of HARQ feedback associated with the HARQ process number is enabled by the HARQ configuration.

14. The method of claim 12, wherein the first set of values is to be used if HARQ feedback associated with the HARQ process number is disabled by the HARQ configuration, and wherein the second set of values is to be used if HARQ feedback associated with the HARQ process number is enabled by the HARQ configuration.

15. The method of claim 12, wherein at least one respective set of values corresponding to the set of power control parameters is configured for each HARQ process of a set of HARQ processes configured for the UE.

16. The method of claim 12, wherein the at least one SRI indicates the at least one of the first set of values corresponding to the set of power control parameters or the second set of values corresponding to the set of power control parameters.

17. The method of claim 12, wherein at least one value of the first set of values corresponding to at least one power control parameter of the set of power control parameters is equal to at least one value of the second set of values corresponding to the at least one power control parameter of the set of power control parameters.

18. The method of claim 12, wherein the at least one message configures a first P0 PUSCH Alpha Set (P0-PUSCH-AlphaSet) including the first set values corresponding to the set of power control parameters and a second P0-PUSCH-AlphaSet including the second set of values corresponding to the set of power control parameters, wherein the DCI further indicates one of the first P0-PUSCH-AlphaSet or the second P0-PUSCH-AlphaSet, and wherein the transmission of the information on the PUSCH is associated with one of the first P0-PUSCH-AlphaSet or the second P0-PUSCH-AlphaSet.

19. The method of claim 12, wherein the first set of values corresponding to the set of power control parameters and the second set of values corresponding to the set of power control parameters are pre-configured at the UE without being received from the base station, and the DCI indicates one of the first set of values or the second set of values is to be used by the UE when transmitting the information.

20. The method of claim 12, wherein the set of power control parameters comprise at least one of an SRI PUSCH) pathloss reference signal (RS) identifier (ID) (SRI-PUSCH-PathlossReferenceRS-Id), an SRI P0 PUSCH Alpha Set ID (SRI-P0-PUSCH-AlphaSetId), or an SRI PUSCH Closed Loop Index (SRI-PUSCH-ClosedLoopIndex).

21. A user equipment (UE), comprising:
   at least one transceiver;
   a memory comprising instructions; and
   at least one processor configured to execute the instructions and cause the UE to:
      receive, via the at least one transceiver, at least one message indicating and at least one of a first set of values corresponding to a set of power control parameters or a second set of values corresponding to the set of power control parameters, wherein the at least one message comprises at least one sounding reference signals (SRS) resource indicator (SRI) associated with an SRI physical uplink shared channel (PUSCH) power control (SRI-PUSCH-PowerControl) parameter of the set of power control parameters;
      receive, via the at least one transceiver, downlink control information (DCI) indicating a hybrid automatic repeat request (HARQ) process number; and
      transmit, via the at least one transceiver, information using the first set of values corresponding to the set of power control parameters or the second set of values corresponding to the set of power control parameters based on a HARQ configuration associated with the HARQ process number.

22. The UE of claim 21, wherein the first set of values corresponding to the set of power control parameters is used to transmit the information if retransmission of HARQ feedback associated with the HARQ process number is disabled by the HARQ configuration, and wherein the second set of values corresponding to the set of power control parameters is used to transmit the information if retransmission of HARQ feedback associated with the HARQ process number is enabled by the HARQ configuration.

23. The UE of claim 21, wherein at least one respective set of values corresponding to the set of power control parameters is configured by a network for each HARQ process of a set of HARQ processes configured for the UE.

24. The UE of claim 21, wherein the at least one SRI indicates the at least one of the first set of values corresponding to the set of power control parameters or the second set of values corresponding to the set of power control parameters.

25. A base station, comprising:
   at least one transceiver;
   a memory comprising instructions; and
   at least one processor configured to execute the instructions and cause the base station to:
      transmit, to a user equipment (UE) via the at least one transceiver, at least one message indicating at least one of a first set of values corresponding to a set of power control parameters or a second set of values corresponding to the set of power control parameters, wherein the at least one message comprises at least one sounding reference signals (SRS) resource indicator (SRI) associated with an SRI physical uplink shared channel (PUSCH) power control (SRI-PUSCH-PowerControl) parameter of the set of power control parameters;

transmit, to the UE via the at least one transceiver, downlink control information (DCI) indicating a hybrid automatic repeat request (HARQ) process number; and receive, from the UE via the at least one transceiver, a transmission of information associated with the first set of values corresponding to the set of power control parameters or the second set of values corresponding to the set of power control parameters based on a HARQ configuration associated with the HARQ process number.

26. The base station of claim 25, wherein the DCI further indicates that the first set of values corresponding to the set of power control parameters is to be used if retransmission of HARQ feedback associated with the HARQ process number is disabled by the HARQ configuration, and wherein DCI further indicates that the second set of values corresponding to the set of power control parameters is to be used if retransmission of HARQ feedback associated with the HARQ process number is enabled by the HARQ configuration.

* * * * *